United States Patent
Wilber

(10) Patent No.: US 12,114,025 B2
(45) Date of Patent: Oct. 8, 2024

(54) VIDEO CLIENT MANAGEMENT OF VIDEO SERVICE FEATURE FLAGS

(71) Applicant: Charter Communications Operating, LLC, St. Louis, MO (US)

(72) Inventor: Steven Wilber, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/945,576

(22) Filed: Jul. 31, 2020

(65) Prior Publication Data

US 2022/0038755 A1 Feb. 3, 2022

(51) Int. Cl.
*G06F 15/16* (2006.01)
*H04N 21/235* (2011.01)
*H04N 21/2385* (2011.01)
*H04N 21/239* (2011.01)
*H04N 21/61* (2011.01)

(52) U.S. Cl.
CPC ..... *H04N 21/2358* (2013.01); *H04N 21/2385* (2013.01); *H04N 21/2393* (2013.01); *H04N 21/6125* (2013.01)

(58) Field of Classification Search
CPC ........... H04N 21/2358; H04N 21/2393; H04N 21/6125; H04N 21/2385
USPC ............... 709/203, 206, 217, 227, 229, 231; 726/11; 707/715, 707, 1; 370/338, 352
See application file for complete search history.

(56) References Cited

U.S. PATENT DOCUMENTS

| | | | |
|---|---|---|---|
| 7,792,963 B2 | 9/2010 | Gould | |
| 8,090,703 B1* | 1/2012 | Agarwal | G06Q 30/0244 |
| | | | 707/707 |
| 10,063,313 B1* | 8/2018 | Al Sayeed | H04J 14/029 |
| 2003/0056217 A1 | 3/2003 | Brooks | |
| 2006/0092895 A1* | 5/2006 | Kim | H04W 12/08 |
| | | | 370/352 |
| 2006/0130107 A1 | 6/2006 | Gonder et al. | |
| 2006/0200440 A1* | 9/2006 | Choi | H04N 21/41407 |
| 2007/0217436 A1 | 9/2007 | Markley | |
| 2009/0013047 A1* | 1/2009 | Adreon | G06Q 10/10 |
| | | | 709/206 |

(Continued)

OTHER PUBLICATIONS

Optimizely, What Are Feature Flags, Jul. 20, 2020, downloaded from Wayback Machine Aug. 1, 2020 from https://web.archive.org/web/20200720051520/https://www.optimizely.c . . . pp.s 1-8.

(Continued)

*Primary Examiner* — Thuong Nguyen
(74) *Attorney, Agent, or Firm* — Otterstedt & Kammer PLLC

(57) ABSTRACT

At a video content network client, obtain, from a remote targeted feature flag configuration server of the video content network, feature flag overrides associated with the client. Send, from the video content network client, to a remote back-end server of the video content network; the feature flag overrides. At the video content network client, obtain, from the remote back-end server, data to be rendered in accordance with an updated feature flag profile including both default feature flag values and feature flag values overridden in accordance with the feature flag overrides. Render the data on the video content network client.

25 Claims, 13 Drawing Sheets

(56) References Cited

U.S. PATENT DOCUMENTS

| | | | |
|---|---|---|---|
| 2009/0191846 A1* | 7/2009 | Shi | H04L 63/0861 455/411 |
| 2009/0248794 A1 | 10/2009 | Helms | |
| 2010/0106798 A1* | 4/2010 | Barreto | G06F 16/957 709/217 |
| 2010/0241948 A1* | 9/2010 | Andeen | G06F 40/143 715/234 |
| 2010/0313236 A1 | 12/2010 | Straub | |
| 2012/0158969 A1* | 6/2012 | Dempsky | H04L 61/6013 709/226 |
| 2012/0197971 A1* | 8/2012 | Jiang | G06F 16/957 709/203 |
| 2012/0210325 A1* | 8/2012 | de Lind van Wijngaarden | H04W 52/0258 718/103 |
| 2013/0291088 A1* | 10/2013 | Shieh | H04L 63/0263 726/11 |
| 2014/0081950 A1* | 3/2014 | Rajan | G06F 16/24549 707/715 |
| 2014/0266909 A1* | 9/2014 | Palanki | G01S 5/0278 342/451 |
| 2014/0337585 A1* | 11/2014 | Grisenthwaite | G06F 12/1475 711/152 |
| 2015/0117526 A1* | 4/2015 | Choi | H04N 19/597 375/240.12 |
| 2015/0282148 A1* | 10/2015 | Le | H04W 72/20 370/329 |
| 2015/0286610 A1* | 10/2015 | Amacker | H04L 67/1097 709/215 |
| 2016/0286600 A1* | 9/2016 | Faccin | H04B 1/3816 |
| 2016/0316247 A1* | 10/2016 | Biagini | H04N 21/25816 |
| 2016/0337718 A1* | 11/2016 | Talbott | H04N 21/4524 |
| 2019/0007753 A1* | 1/2019 | Yang | H04L 65/4076 |
| 2020/0051161 A1* | 2/2020 | Dylla | G06F 21/6245 |
| 2020/0104773 A1* | 4/2020 | Pechacek | G06Q 10/101 |
| 2020/0128089 A1* | 4/2020 | Rizvi | H04L 67/53 |
| 2020/0374113 A1* | 11/2020 | Noam | G06F 21/64 |

OTHER PUBLICATIONS

Wikipedia, Representational state transfer (REST), page last updated Jul. 29, 2020, pp. 1-8, downloaded Aug. 1, 2020 from https://en.wikipedia.org/wiki/Representational_state_transfer.

* cited by examiner

VIDEO CLIENT MANAGEMENT OF VIDEO SERVICE FEATURE FLAGS

FIELD OF THE INVENTION

The present invention relates generally to the electrical, electronic, and computer arts, and more particularly relates to video content networks and the like.

BACKGROUND OF THE INVENTION

With the advent of digital communications technology, TV program streams are typically transmitted in digital formats. For example, Digital Satellite System (DSS), Digital Broadcast Services (DBS), and Advanced Television Standards Committee (ATSC) program streams are digitally formatted pursuant to the well-known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Video on demand (VOD) systems allow users to select and watch video content over a network. Some VOD systems "stream" content for real-time viewing. Others "download" the content to a set-top box before viewing starts. Use of digital video recorders (DVRs), also known as personal video recorders (PVRs), is ubiquitous. A "network PVR (NPVR)" (also referred to as an NDVR (Network Digital Video Recorder)) service allows the user to perform the analogous DVR functions through use of a network, rather than via a local DVR at the user premises.

Video clients often call into back-end systems to obtain the data they need to display guide and on-demand menu pages (which show, respectively, programming that is available via broadcast or on-demand). The back-end systems typically have to manage feature flags so as not to return new features to clients that are not expecting those features. Usually, there is a careful back-end/front-end release coordination, allowing for a release that all users obtain at the same time.

SUMMARY OF THE INVENTION

Techniques are provided for video client management of video service feature flags. In one aspect, an exemplary method includes, at a video content network client, obtaining, from a remote targeted feature flag configuration server of the video content network, feature flag overrides associated with the client; sending, from the video content network client, to a remote back-end server of the video content network; the feature flag overrides; at the video content network client, obtaining, from the remote back-end server, data to be rendered in accordance with an updated feature flag profile including both default feature flag values and feature flag values overridden in accordance with the feature flag overrides; and rendering the data on the video content network client.

In another aspect, an exemplary video content network system is connected to at least one client and includes a remote targeted feature flag configuration server that provides, to the client, feature flag overrides associated with the client; and a remote back-end server that obtains, from the client, the feature flag overrides, and provides, to the client, data to be rendered in accordance with an updated feature flag profile including both default feature flag values and feature flag values overridden in accordance with the feature flag overrides.

In another aspect, an exemplary method includes providing, from a remote targeted feature flag configuration server of a video content network system, to a client, feature flag overrides associated with said client; obtaining, at a remote back-end server, from said client, said feature flag overrides; and providing, from said remote back-end server, to said client, data to be rendered in accordance with an updated feature flag profile comprising both default feature flag values and feature flag values overridden in accordance with said feature flag overrides.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a client, targeted feature flag configuration server, back-end server, or any two or more of them networked as a system) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of the following:

Ability for client engineers to test or integrate against backend feature changes without affecting all users of that backend system;

Techniques wherein coordination of testing backend changes on the client becomes a small, low-risk issue as only the tester's account can be affected;

Techniques wherein development of partially completed features can be deployed to shared environments as only accounts with the feature enabled will see the partially completed changes;

improving the performance of a content network or the like by reducing security risk and/or downtime during new feature rollout by rolling out in a selective manner.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
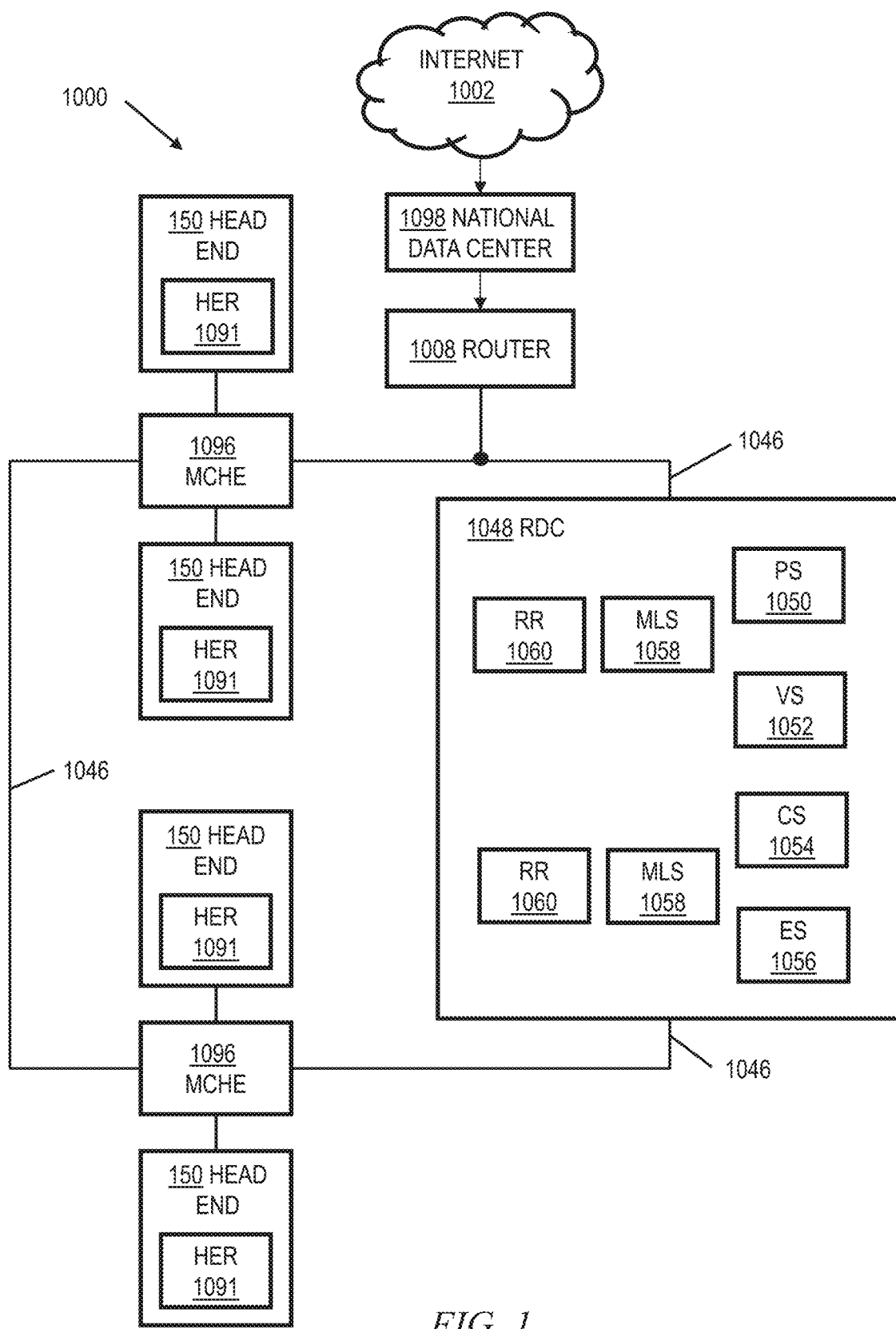
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
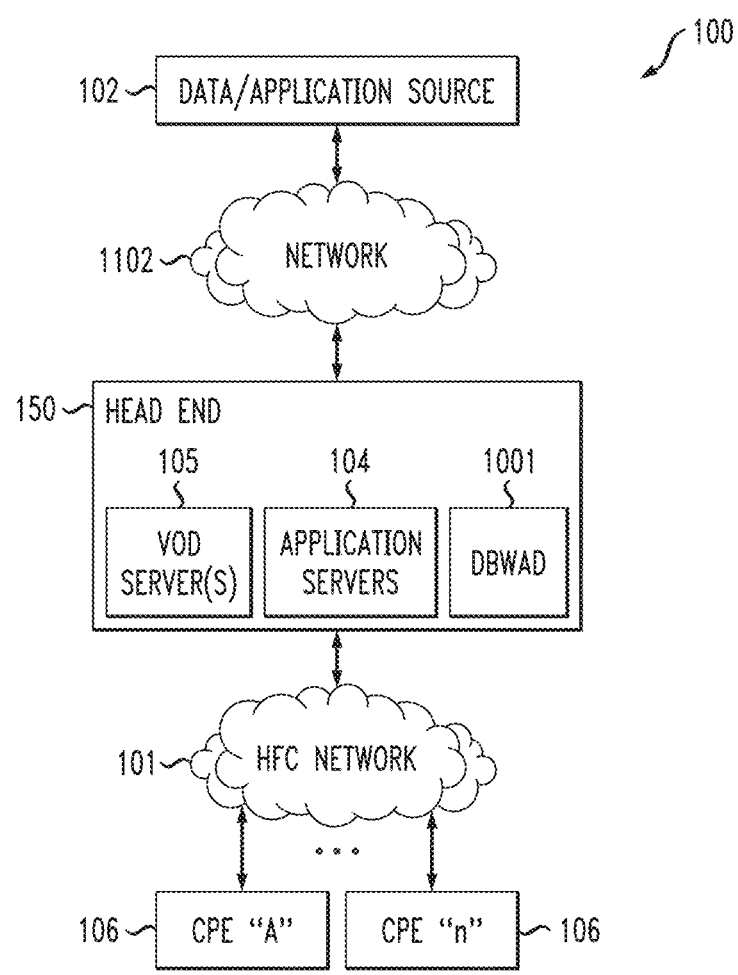
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third-party data source, application vendor web site, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
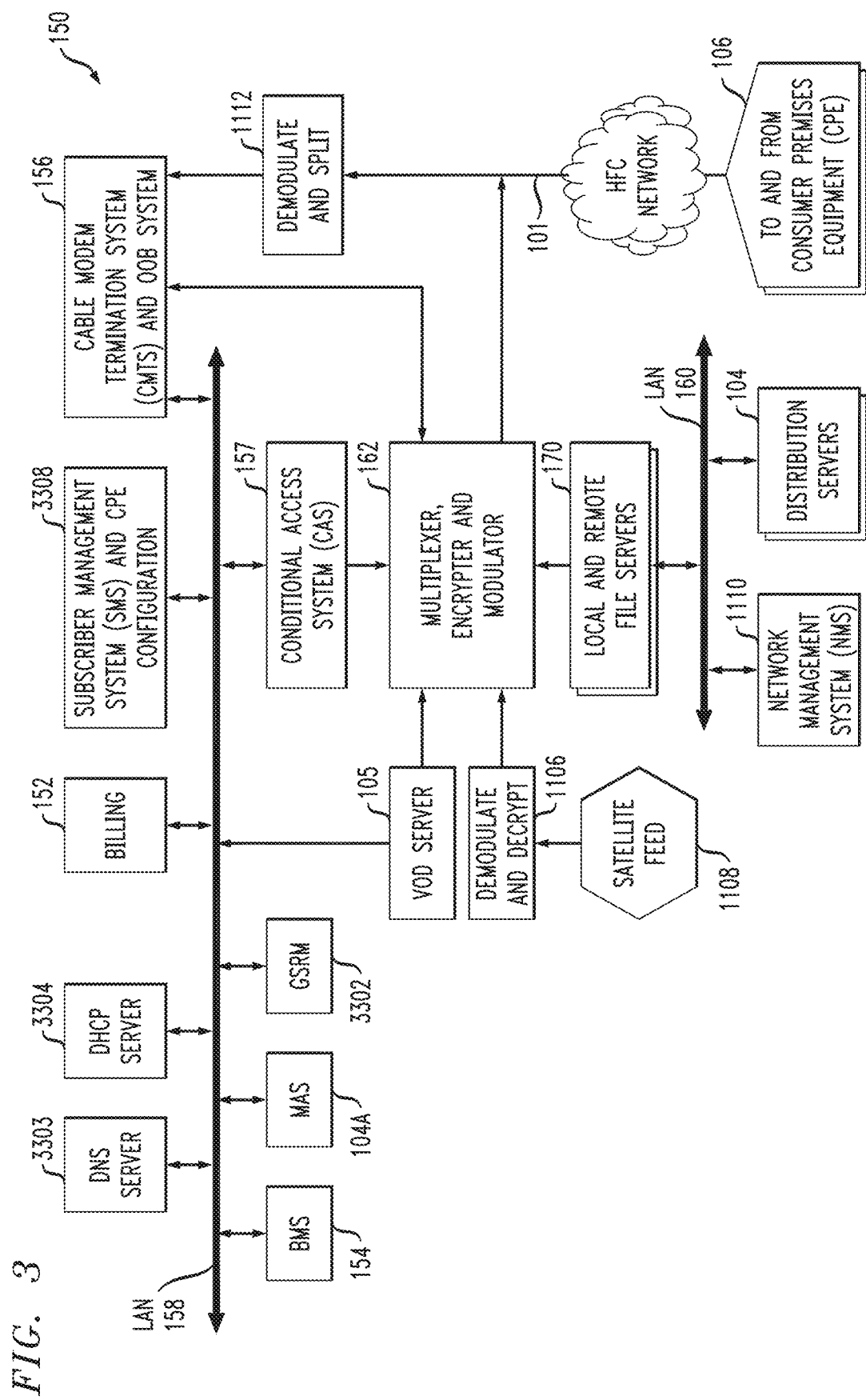
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
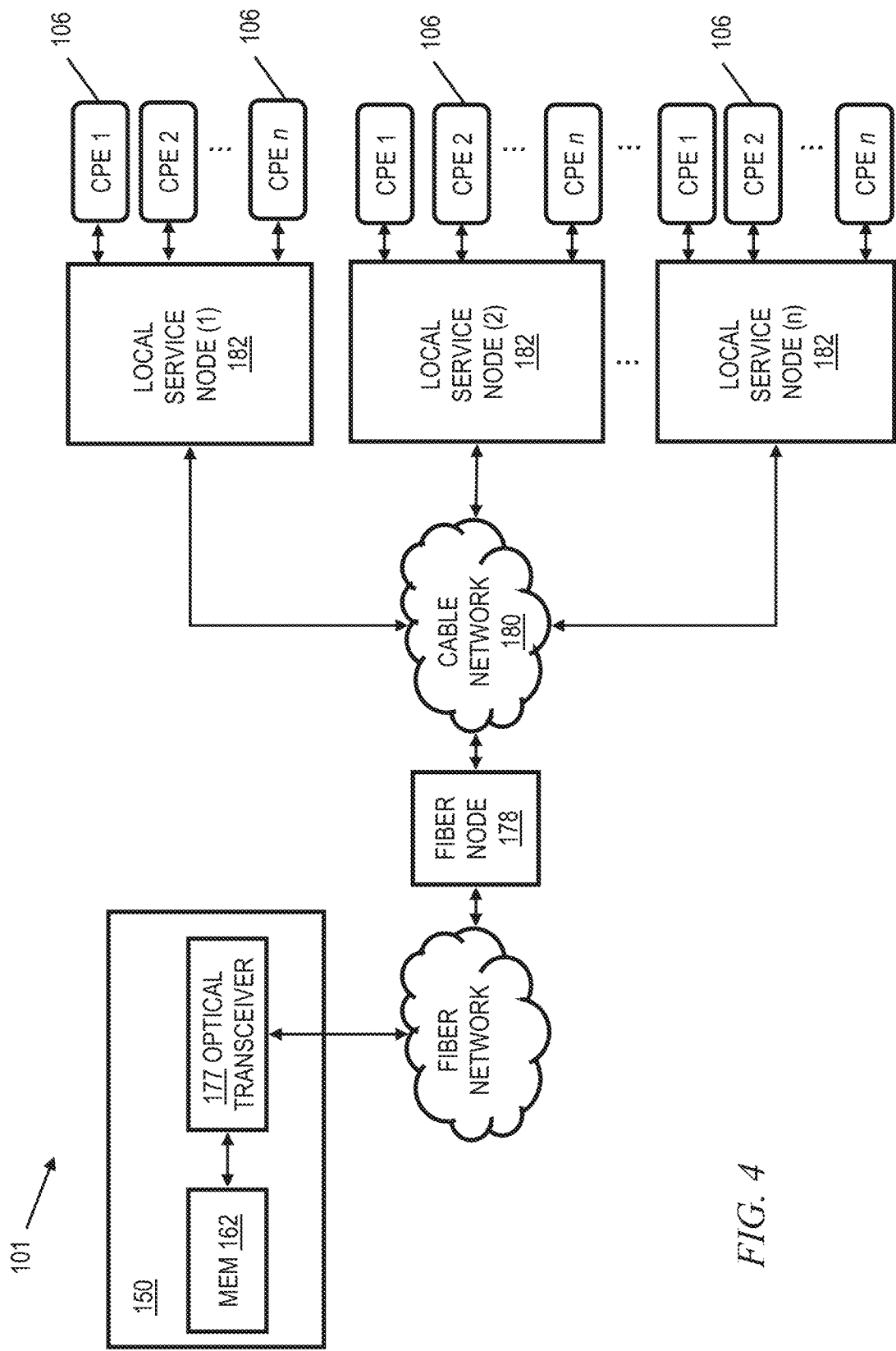
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
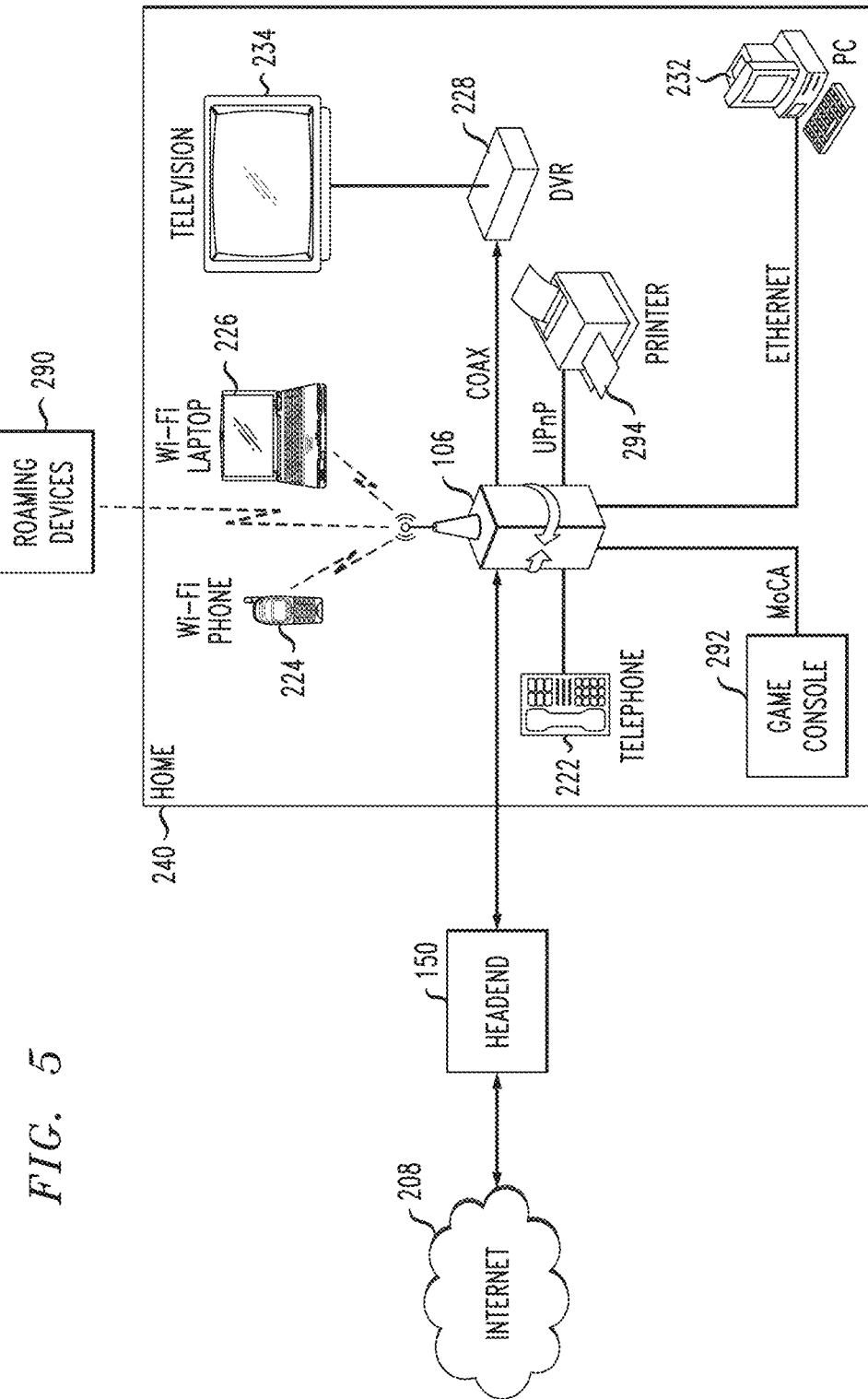
FIG. 5 is a functional block diagram of a premises network, including an exemplary centralized customer premises equipment (CPE) unit, interfacing with a head end such as that of FIG. 3.
Figure 6:
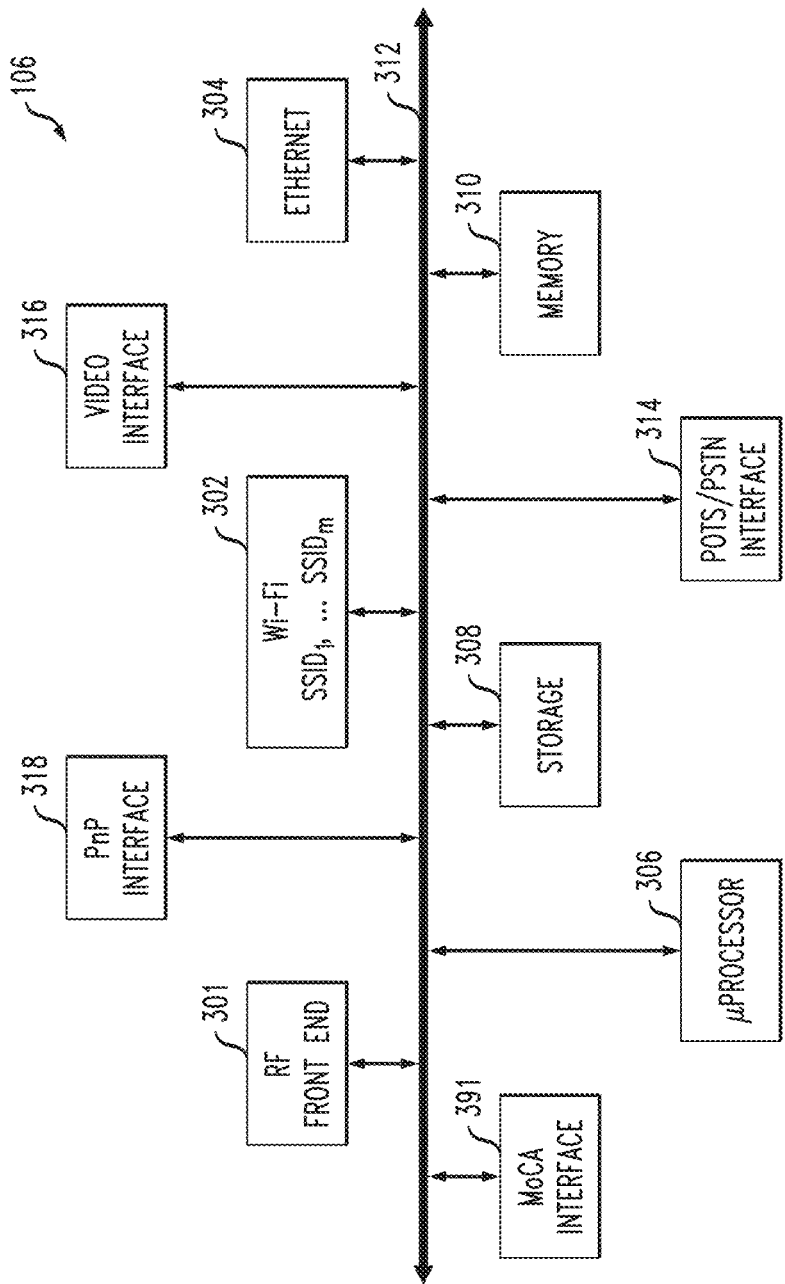
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
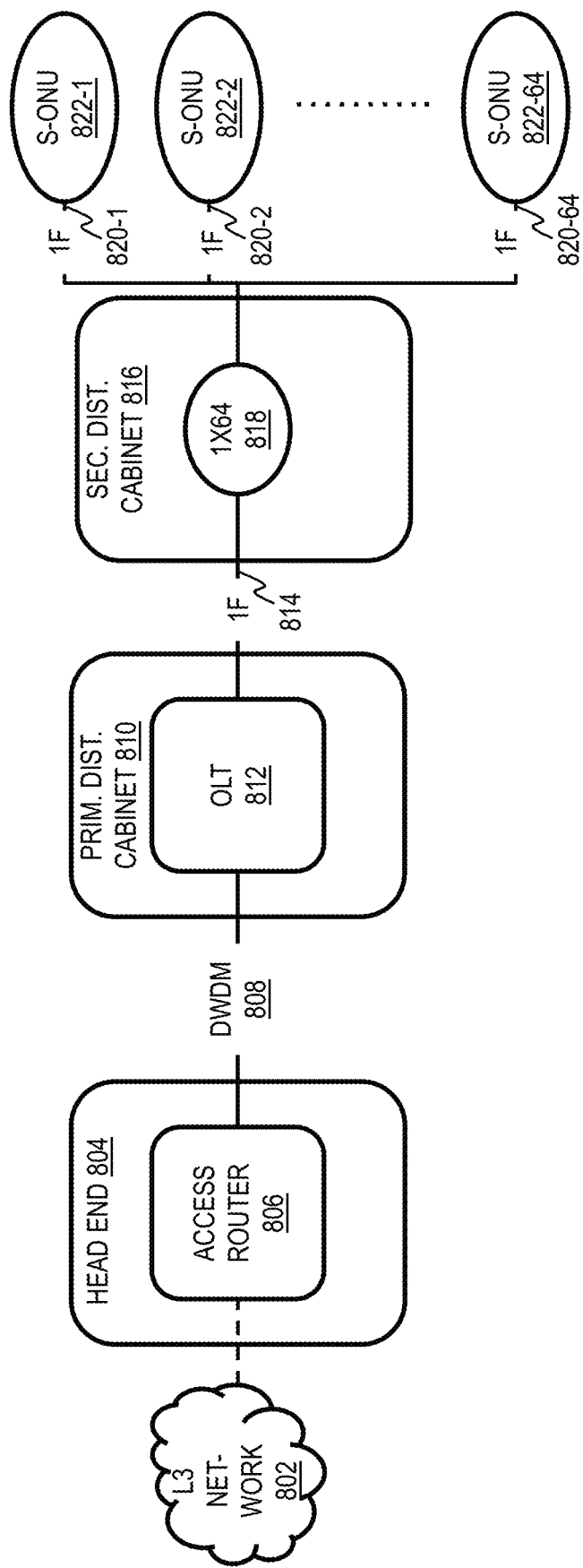
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
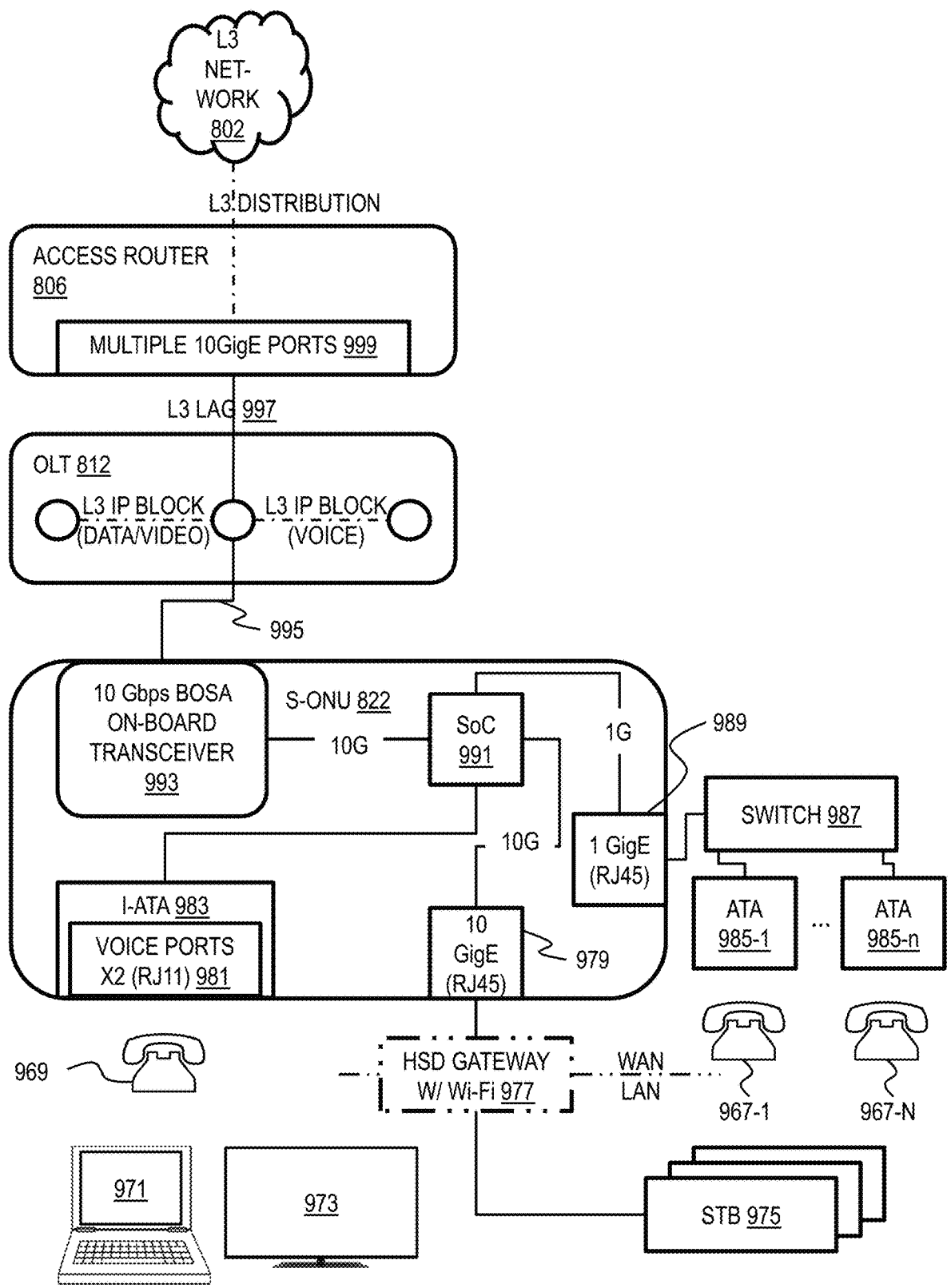
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" and/or "on-demand" content (e.g., video programming), the systems of FIGS. 1-6, 8, and 9 can optionally also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor their particular assigned RF channel (such as via a port or socket ID/address, or other such mechanism) for IP packets intended for the subscriber premises/address that they serve.

Figure 10:
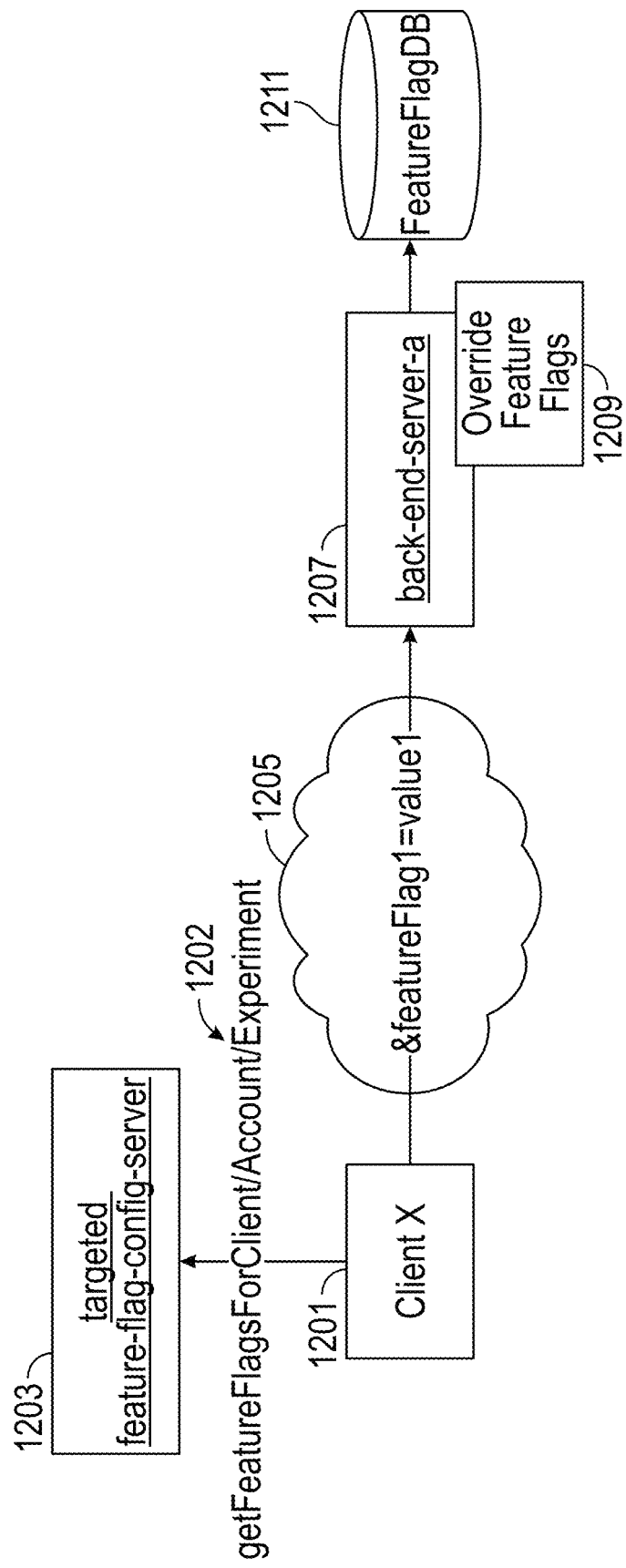
FIG. 10 is a block diagram of an exemplary system for video client management of video service feature flags for all or a subset of users, in accordance with an example embodiment.
Figure 11:
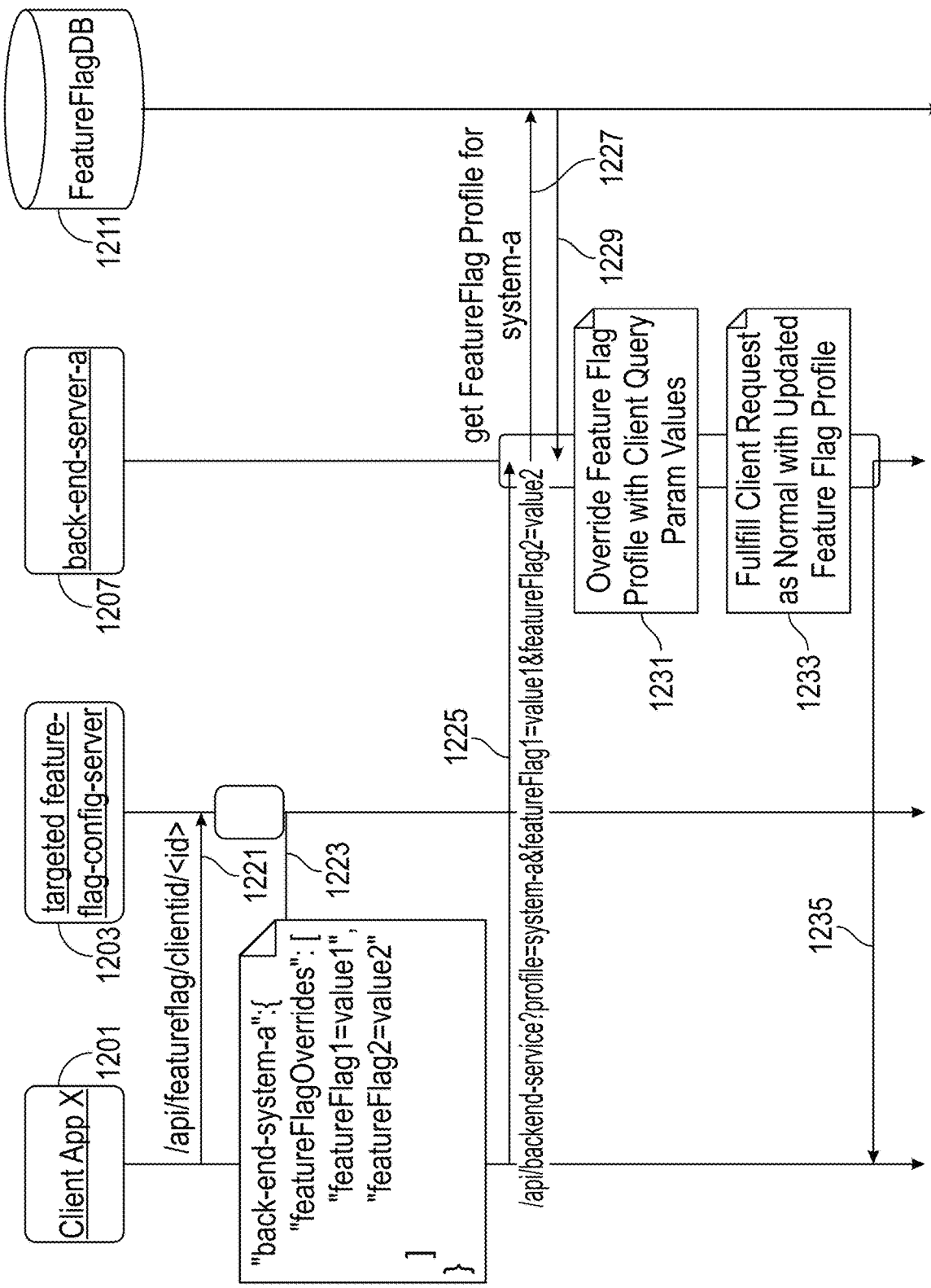
FIG. 11 is a data flow sequence diagram of an exemplary system for video client management of video service feature flags for all or a subset of users, in accordance with an example embodiment.

Referring to FIGS. 10 and 11, as noted, video clients 1201 often call into back-end systems 1207 to obtain the data they need to display program guide and on-demand menu pages. The back-end systems typically have to manage feature flags so as not to return new features to clients that are not expecting those features. Usually, there is a careful back-end/front-end release coordination, allowing for a release that all users obtain at the same time. One or more embodiments advantageously provide video clients 1201 a mechanism to instruct a back-end service (e.g. server 1207 and database 1211) to enable a feature flag for a subset of the total population, allowing for canary rollouts of features (slow increase in users over time; the small subset of users acts as a "canary in a coal mine" to warn of any issues with the feature prior to widespread implementation), A/B experimentation, and the like. A/B testing provides, for example, an experimentation method to prove that a feature is useful to customers of an MSO or the like. For example, an experiment could utilize 10% of all customers. One-half off the 10%, or 5%, would be in the control group and the other one-half of them, another 5% of the total, would be in a variant group (there can be multiple variants). The control group does not get the feature; the variant group does get the feature. Analytics can then be run on only those accounts to see if behavior of the users with the enabled feature(s) is different after the feature(s) is/are enabled. The experiment can be run for a predetermined amount of time.

One or more embodiments enable a client 1201 to use a Targeted Feature Flag Config server 1203 to activate features on back-end systems. Embodiments can be configured, for example, to manage and/or customize flags for all users and/or a subset of users.

Client 1201 can correspond, for example, to end devices such as a smart phone 224; television 234, 973; game console 292; laptop 226, 971; PC 232; a set-top box 975; and the like. Targeted Feature Flag Config server 1203 can be located, for example, in a national data center 1098; a regional data center 1048; a head end 150; or in a cloud provider accessed via Internet 1002 (e.g., Amazon Wes Services (AWS) Cloud Computing Services available from Amazon.com, Inc. Seattle, WA, USA or Google Cloud Platform Cloud Computing Services available from Google, Inc., Mountain View, CA, USA). Back end server 1207 can be located, for example, in a national data center 1098; a regional data center 1048; a head end 150; or in a cloud provider accessed via Internet 1002. Database 1211 can be collocated with server 1207 or located on a network accessible to server 1207. Servers 1203 and 1207 can each be implemented as one or more physical and/or virtual servers. As will be appreciated by the skilled artisan, virtual servers are implemented on underlying hardware servers using, for example, a hypervisor or the like. The client 1201, server 1203, and server 1207 can communicate, for example, as explained with respect to FIGS. 1-9. Client 1201 can, but need not, be in a customer premises; it could roam and connect to the Internet via wired or wireless connection (e.g. Wi-Fi, LAN, cellular network) or the like.

One or more embodiments employ a back-end system including a client-facing set of services responsible for page-by-page navigation, returning the content displayed on the page, determining the layout of the page, and determining what navigation actions can be taken from this page. A non-limiting example of a possible goal of this type of design is to put all of the business logic (e.g. complex business logic that is shared across devices) in a back-end system and put only view information on the front-end client, allowing for the quick roll-out of features and bug fixes across a multitude of clients. Other embodiments could distribute the functionality differently; for example, the business logic could be split 50/50 between the back-end system and the client. In some instances, it may be quite desirable for the client to be completely "dumb"; i.e., the backend would perform all business logic and the client just knows how to display data provided by the backend. This is because backends tend to have faster release cycles, more compute power, and the centralization of functionality makes onboarding new clients easier. Again, however, this is a non-limiting example.

Many new features can be developed on this back-end platform, and displayed on the front-end platform, as time goes on. When new features are developed, it may be desirable to deploy to employees first, then to a subset of customers, then to all customers. Another use case is the disabling of features from the client. Suppose the default back-end service behavior is to enable a feature for all devices and accounts. Further suppose that a bug is found only on a single device, or a group of users with a common configuration. One or more embodiments can be used to disable the broken functionality on that device or the accounts of that group of users. In another aspect, consider a call center that receives a customer complaint that the customer does not like some new feature or that some new feature is broken. One or more embodiments can be used to disable the functionality for that one customer.

In one or more embodiments, the back-end servers, such as 1207, have profiles, defining a list of feature flags, for each version of each client. These feature flags represent the default state, generally in the 'off' position. In one or more embodiments, for each client-facing API, the back-end servers define a new query param (see discussion of 1225 below) allowing clients to override the 'default' feature flag value. One or more embodiments include a Targeted-Feature-Flag-Delivery system which the client 1201 downloads at initialization time from server 1203. This system provides the clients with a list of feature flags if it determines they are part of a target group. Target groups can be defined, for example, as a whitelist of IP addresses or groups in experiment variants. A target group can be employed to split out a list of accounts for special functionality using a wide variety of criteria; e.g., Employee Field Trials, Alpha/Beta testers, demoing groups, test accounts, customers who purchase specific package levels, customers who opt into or opt out of a feature, experiment groups, and the like. One of the fields associated with the targeted feature flag system is a back-end feature flag enablement. When these flags are set, the client passes these flags to the back-end using the pre-defined query param. One pertinent aspect is the activation of back-end feature flags from the front-end (some architectures can have experiments and feature rollouts initiated from the front-end). Another pertinent aspect of one or more embodiments is the ability to roll out back-end features to a subset of customers. By way of further comment, a common goal of backend systems is to be completely stateless. This means the backend knows nothing about the user or account or the user's previous interaction with the system. All state information has to be passed from the client to the server with the request. As such, the control of feature flags on a per user or account level "belongs" with the client as in one or more embodiments, clients are always stateful. Of course, other embodiments can be configured differently.

One or more embodiments advantageously permit activation of back-end feature flags from the front end; for example, it is possible to roll out back-end features to a subset of customers. The skilled artisan will be familiar with feature flags per se. As will be appreciated by the skilled artisan, feature flags (also known as feature toggles or feature switches) are a software development technique that turns certain functionality on and off during runtime, without deploying new code. One or more embodiments include account-level enabling of feature flags. One or more embodiments allow client teams and client organizations to be able to interface with the full back-end feature set though client interfaces. Backend services, such as a navigation server, tend to have many feature flags. In one or more embodiments, the client now has the ability to enable any combination of feature flags, on the backend system, for any single account or group of accounts using any of the previously described methodologies for selecting accounts (Canary, Experiment, etc.).

One or more embodiments can be used, for example, in the case of a thick service and a thin client, where the thick service will implement all (can be less than all in other embodiments) the new features; e.g. a new search feature. Suppose it is not desired to deploy the new search feature on all clients right away. Suppose that it is desired to employ the new search feature on only on a subset of clients and on only on a subset of accounts within a given client type.

Currently, there is no way for a client, in conjunction with a back-end system, to enable and disable certain functions per account level. One or more embodiments allow, when ready to deploy, one or more of: (i) listing individual accounts; (ii) turning on back-end features for a list of white-listed accounts; and (iii) running AB testing where, say, 15% of the accounts are used for an experiment (say, 5% of accounts (⅓ of the tested accounts) get a certain feature A, 5% of accounts (another ⅓ of the tested accounts) get a feature B, and another 5% of accounts (final ⅓ of the tested accounts) are a control group. Alternatively, or in addition, one or more embodiments also allow so-called "canary rollouts" where 1% of the customer base obtains a feature and the percentage is increased slowly over time; say, 5%, 10%, 15% . . . 100%—a slow rollout. Time intervals can be chosen by the operations team, for example, using suitable heuristics (e.g. dependent on how risky the change is to the business). In a non-limiting example, one-week between ramp-ups is used. Furthermore, alternatively, or in addition, one or more embodiments also allow enabling feature(s) just for a single engineer on a system so system operators can carry out development; e.g., without having to turn the feature(s) on globally for everyone. For example, the feature(s) may just be enabled for a development lab.

One or more embodiments advantageously provide the ability to switch back-end features on and off on a per-account level.

FIG. 10 is a block diagram of an exemplary system for video client management of video service feature flags, in accordance with an example embodiment. In the type of exemplary organization of components depicted in FIG. 10, the ability to turn features on and off from an account level is carried out within a client tier. Elements 1201, 1203 can optionally be located in a client tier that back-end systems do not have any interaction with. More specifically, in a non-limiting example, 1201 is the client device (phone, set-top box, consumer electronics (CE) device), while 1203 is an account configuration targeting web service that is closely integrated with the client-tier and has no interaction with backend components, only clients. Other approaches can be employed in other embodiments.

Client X 1201 can include, for example, a remote control; a set-top box (e.g., 975 or connected to/included in 106); smart cell phone 224; or the like. The cell phone can, for example, act as a standalone device (a full guide with viewing capabilities) and can also act as a companion device (a remote that allows the user to control the user's home set-top box). In the former capacity, the phone can control cloud-base DVR functionality. Client X 1201, as part of its start-up process (for example), calls into a targeted feature flag config (configuration) server 1203 that provides a Targeted-Feature-Flag-Delivery service. Client 1201 asks server 1203 for a list of the feature flags to be overridden on back-end server A 1207. This request will include, for example, account information and device IDs; a non-limiting example is shown at 1202. The targeted feature flag config server 1203 can then look up what features should be enabled (disabled status overridden) for the account associated with Client X 1201 (e.g. "Account Y"). The targeted feature flag config server 1203 enables, for example, whitelisting, experimentation, and the like. In one or more embodiments, Client X makes a RESTFUL API call 1202 to the targeted feature flag config server 1203. The targeted feature flag config server 1203 resides, for example, in the cloud.

While the Client X 1201 obtains the list of feature flags that it is going to override, Back End Server A 1207 already has, for Client Type X, a set of default values for feature flags. For example, suppose Client X is an Android® device (registered mark of GOOGLE LLC MOUNTAIN VIEW CALIFORNIA USA). Back End Server A 1207 already has a list of feature flags for Android® Device Version 5, e.g. Suppose all the features are turned off, and that Back-End Server A has just implemented a new search feature and by default it has this new feature turned off for Android® Version 5. Most Android® Version 5 clients that call in will get a value of "turned off" and will not have the feature turned on in the back-end system. However, in the example, Client X, which is an Android® Version 5 client, is part of an account, white list, or experiment that gets back a feature flag from the targeted feature flag config server 1203 which it passes to the Back End Server A 1207 in message 1205, causing Back End Server A to override the default for Client X associated with Account Y, as seen at 1209. The default flags can be stored, for example, in a profile in database 1211.

FIG. 11 is a data flow sequence diagram of an exemplary system for video client management of video service feature flags, in accordance with an example embodiment. Client X 1201 (e.g. via an "app" in memory 730—see discussion of FIG. 7 elsewhere herein), during its start-up process (for example), and/or at some interval, calls into the targeted feature flag config server 1203 to obtain the list of feature overrides to make on the back-end server A 1207. This call can be, for example, via an API and is shown at 1221 in FIG. 11 (1202 in FIG. 10 and 1221 in FIG. 11 are both non-limiting examples). Note that a set-top terminal is typically associated with a long-lived process which should call in both on start-up and again at periodic intervals, while shorter-lived processes might call in only at start-up. The targeted feature flag config server effectively determines "this is Account Y and it is part of a whitelist group or part of an experiment so we will override feature flags on back-end server A for this client." The response with overrides is shown at 1223. As seen at 1225 in FIG. 11 (1225 in FIG. 11 and 1205 in FIG. 10 are both non-limiting examples), Client X 1201 then passes those feature flag values into back end server A 1207 as Query Params, HTTP Headers, via an HTTP POST body (e.g. client 1201 does the post and passes it as a post body) or the like.

Back end server A 1207 obtains those feature flag override values and looks up the default values for Client X (in the feature flag database "FeatureFlagDB" 1211—the query is seen at 1227 and the response at 1229). Back end server A then overrides the default feature flag values from the database 1211, as seen at 1231, as per what was passed by the client in message 1225. The back-end server 1207 now has a plurality of feature flags associated with client 1201—some of them are default values and some of them are overridden values. As seen at 1233, 1235, Back End Server A 1207 fulfills the request; when Back End Server A 1207 reaches the code that deals with a new feature, the feature flag will indicate to enable that new feature because the client 1201 enabled it through the query param 1225; i.e., the updated feature flag profile for client 1201 includes default values from database 1211 for features not overridden and includes the overridden values for features that were overridden.

In one or more embodiments, Client X 1201 "knows" that certain default feature flags should be overridden because client 1201 calls targeted feature flag config server 1203 with an indication of its account ID and device ID. The targeted feature flag config server 1203 includes logic for whitelisting, experimentation, canary rollout, and the like. In executing the logic, the targeted feature flag config server 1203 "sees" that the client 1201 is in, e.g., a (whitelist) group that should have certain feature flag overrides. There is logic on the targeted feature flag config server 1203 that stores certain overrides for each account. The client 1201 communicates with the back-end server 1207, which obtains the default profile from the database 1211; server 1207 then selectively overrides the profile based on the information from the targeted feature flag config server 1203 that was relayed by the client 1201.

Thus, one or more embodiments advantageously allow the client 1201 to control the enablement and disablement of the feature flags on the back-end server 1207. The client 1201 sends a communication to the back-end server 1207 based on the information it received from the targeted feature flag config server 1203.

Consider a case where Client App X 1201 has a feature such as "the button is blue." It is desired to have a new feature to make the button red. The client itself can have features and feature flags. While the client can call into the feature flag config server 1203 to change features on the client, one or more embodiments allow the client to control the back-end features. One or more embodiments are useful, for example, in a thick server thin client environment (e.g., server has more functionality than the client—for example, the client has minimal functionality, and the server has most of the functionality. As a further specific example, in some cases, clients are responsible for displaying the graphics on the screen (button locations, colors, fonts, etc.). Backend services are responsible for the business functionality (what functional activities happen when a button is pressed, a text-field is populated, or a new page is loaded). Furthermore in this regard, in one or more embodiments, a goal of back-end services is to implement shared functionality. For example, suppose an MSO supports twelve different types of clients (e.g., smart phones, remote-controlled televisions, . . . ). It is desirable for common or shared functionality to be implemented in the back end (e.g., RDVR (remote DVR), navigation of program guides, search functionality, and the like). Functionality on the client is preferably limited to client-specific logic, such as how to render material provided to the client by the back-end.

Thus, one or more embodiments enable activation of back-end (e.g. on server 1207) feature flags from the front end (e.g. via client 1201); provide the ability to roll out back-end features to a subset of customers; and the like. For example, the targeted feature flag config server 1203 can have logic in it to, for example, only enable a feature for 5% of the customers. The targeted feature flag config server can have the ability to whitelist accounts. Say, a certain 250 accounts are to have the feature flag, or the feature flag is to be assigned by percentage. For example, in the latter case, 5% of customers are randomly given a feature flag. One or more embodiments also permit running experiments with variants—say, 5% of customers get the Variant A feature flag, 5% of customers get the Variant B feature flag, 5% serve as a control, and so on. One advantage of one or more embodiments is that the client can now control back-end feature enablement. The client can use logic on the targeted feature flag config server to push out changes/enable features on the back-end server.

One or more embodiments advantageously allow account-level targeting of backend features. There are several ways this can be utilized, including, for example, canary release of the feature (by % of customers or by market or device), experimentation on the feature (A/B Testing), Whitelisting/Blacklisting of the feature, as a mechanism for enabling the feature for all customers, and the like.

Recapitulation

Given the discussion thus far, it will be appreciated that, in general terms, an exemplary method, according to an aspect of the invention, includes the step of, at a video content network client 1201, obtaining, from a remote targeted feature flag configuration server 1203 of the video content network 101, feature flag overrides 1223 associated with the client. A further step includes sending, from the video content network client 1201, to a remote back-end server 1207 of the video content network; the feature flag overrides. For example, Client X 1201 passes the feature flag values into back end server A 1207 as query params, HTTP headers, via an HTTP post, or the like.

As seen at 1233, 1235, a further step includes, at the video content network client, obtaining, from the remote back-end server, data to be rendered in accordance with an updated feature flag profile including both default feature flag values and feature flag values overridden in accordance with the feature flag overrides. An even further step includes rendering the data on the video content network client.

In a non-limiting example, there is no communication or connectivity between the back-end server and the config-flag server. The config server could be, for example, in a protected network where the backend server could be more open. The backend server could have multiple instances running around the country, while the config-flag server could be centralized. Other embodiments could be architected differently.

Figure 12:
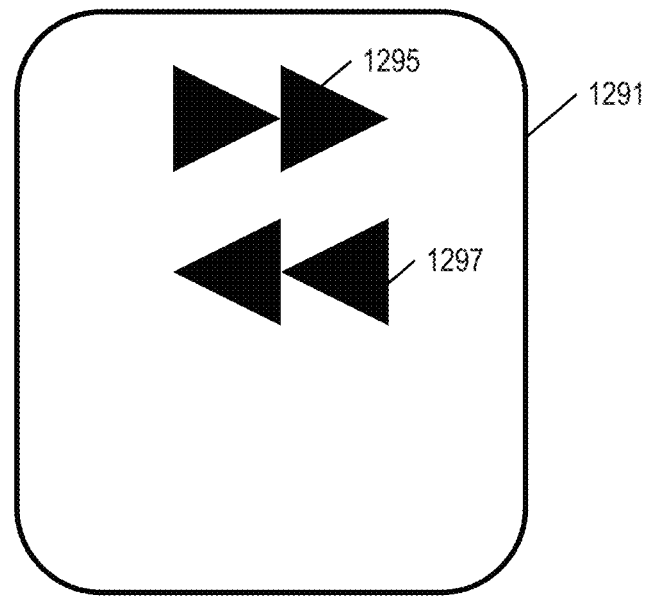
FIG. 12 shows adjustment of a client user interface in accordance with feature flags, according to an aspect of the invention.
Figure 12:
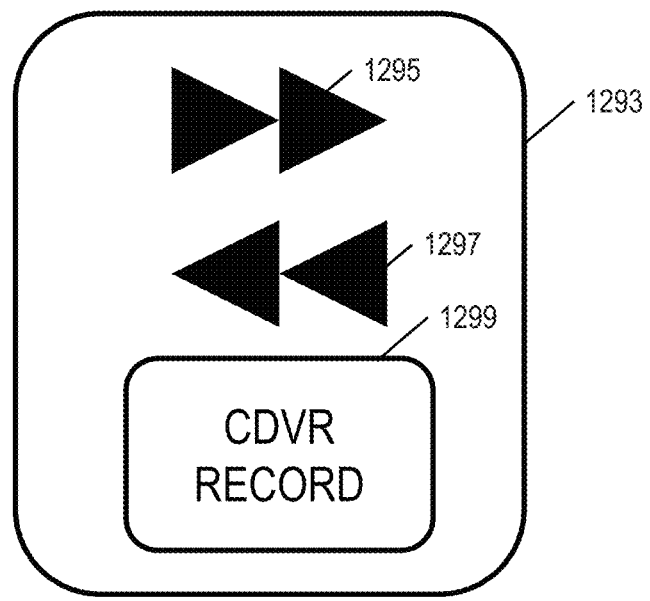

In one or more embodiments, the client does not obtain the full list of feature flags back from the back-end service. Rather, the back-end service executes business logic with the full list of default feature flags modified in accordance with the feature flag overrides. For example, refer to FIG. 12. View 1291 shows a simplified default user interface to be displayed on a client. Fast forward 1295 and reverse 1297 are indicative of a variety of features that can be provided. Suppose it is desired to roll out a new a new RECORD CDVR (cloud DVR) button 1299. View 1293 shows a user interface rendered in accordance with a feature flag that enables the new button. The back-end server executes its code and when it reaches the code segment about whether to include the CDVR button, based on the overridden feature flag, it returns the button 1299 to the client.

It will thus be appreciated that in one or more embodiments, communication 1235 is not a list of flags per se but rather a result generated by the back-end based on the flags. For example, in the case of the button 1299, what is returned could include a JSON structure or HTML code that instantiates the button on the user's screen. Further examples include new user interface features, new search algorithms that it is desired to gradually roll out, and the like. In the latter example, there is, for example, a default search algorithm but a flag is set to use a new search algorithm for some group of customers. The new search algorithm is executed on the server 1207 which returns the search results at 1235. The overridden flags change what is displayed on the client from the default such as a new button or different search result.

In one or more embodiments, the remote back-end server retrieves the default feature flag values from a feature flag database 1211, as seen at 1227, 1229; generates the updated feature flag profile based on the retrieved default feature flag values and the feature flag overrides, as seen at 1231; and uses business logic to generate the data in accordance with the updated feature flag profile, as seen at 1233.

In one or more embodiments, the feature flag database 1211 includes a plurality of profiles for a plurality of versions of a plurality of clients including the video content network client.

The data returned at 1235 can include, for example, data specifying a user interface for the client; or search results setting forth results of a search conducted by the back-end server using a non-default search routine specified by the feature flag overrides. Indeed, the feature flag overrides and returned data can relate to many different aspects, such as program guide(s) and/or on demand menu(s), bug fixes; search features; cloud DVR functionality; content recommendations; updates to existing features (a new search algorithm is a non-limiting example); advertisements; and the like).

In some instances, the video content network client sends a request 1202, 1221 to the remote targeted feature flag configuration server upon initialization to obtain the feature flag overrides. As noted, periodic requests can be used in some instances. In one or more embodiments, the request includes account information for an account holder associated with the client, and a device identifier for the client. The request can be implemented, for example, via an application program interface (API) call (RESTFUL is a non-limiting example of an API call).

In some instances, the default feature flag value(s) is/are OFF and the feature flag overrides turn corresponding features ON. The converse can also be true, or some features can be default ON and some features default OFF. Refer to the above discussion of disabling of features from the client.

In some embodiments, the remote targeted feature flag configuration server uses logic to determine the feature flag overrides associated with the client based on the account information and the device identifier (for example, finding the client in a target group).

One or more embodiments further include repeating the steps of obtaining the feature flag overrides, sending the feature flag overrides, obtaining the data to be rendered, and rendering the data on the client for a plurality of additional clients to implement a gradual feature rollout. As discussed elsewhere herein, examples of types of rollouts include whitelisting; canary; A/B experimentation; employees first; subset of customers; all customers; employing a new search feature on only on a subset of clients and on only on a subset of accounts within a given client type; by individual account(s); for an engineer/development lab; and the like.

Figure 13A:
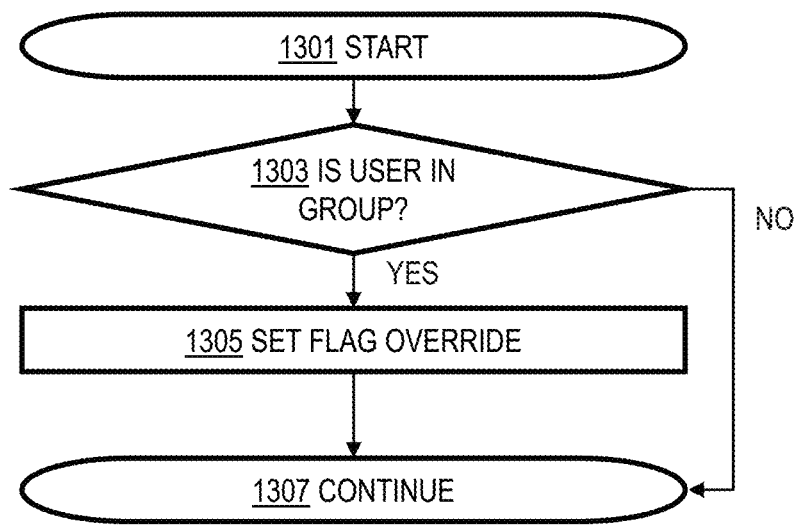
FIGS. 13A and 13B show exemplary logic that can be implemented on a targeted feature configuration flag server, according to an aspect of the invention.
Figure 13B:
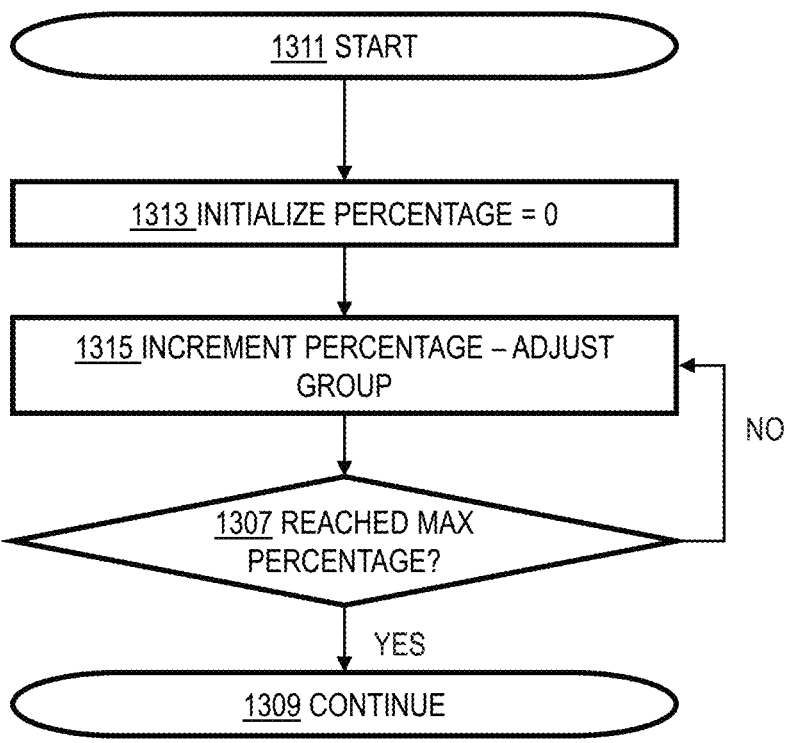

FIG. 13A shows a flow chart of exemplary logic that can be implemented on server 1203. The logic begins at 1301. At 1303, determine whether the user is in a group that is to have custom feature flags. If YES, proceed to 1305 and set the flag override(s) for that user. The process continues at 1307, awaiting the next client communication. Id the user is not in a group to have custom flags (NO branch of decision block 1303), proceed t0 1307 without any flag override(s). FIG. 13B shows a non-limiting example of how a group can be populated. The logic begins at 1311. At 1313, set the initial percentage equal to zero. At 1315, increment the percentage by the desired amount (say, roll out to the first 5%). Adjust group membership by assigning 5% of viewers to a gradual rollout group. As seen at decision block 1307, continue until the desired percentage of users are in the group; add another 5% if the maximum desired percentage has not been reached. This loop of checking and incrementing is repeated, for example, on a time-delayed basis, such that 5% of users have the feature the first week, 10% the second week, and so on. Other percentages and time intervals can be sued in other embodiments.

Many different features can be provided, such as thick server/thin client with all business logic in the back end and the front end only functioning to view information, with the thick service implementing the new features. As noted, the client can be located in a premises of the customer of the MSO, or elsewhere.

In another aspect, a video content network client 1201 includes a memory 730; and at least one processor 720, coupled to the memory, and operative to: obtain, from a remote targeted feature flag configuration server of the video content network, feature flag overrides associated with the client; send, from the video content network client, to a remote back-end server of the video content network; the feature flag overrides; obtain, from the remote back-end server, data to be rendered in accordance with an updated feature flag profile including both default feature flag values and feature flag values overridden in accordance with the feature flag overrides; and render the data on the video content network client, as discussed with regard to the above method.

In still another aspect, a video content network system is connected to at least one client. The client(s) can be workpiece(s) separate from the system (in other embodiments the client(s) can be part of the system). The system includes a remote targeted feature flag configuration server 1203 that provides, to the client 1201, feature flag overrides associated with the client, as seen at 1223. Also included is a remote back-end server 1207 that obtains, from the client, the feature flag overrides, as seen at 1225, and provides, to the client, data 1235 to be rendered in accordance with an updated feature flag profile including both default feature flag values and feature flag values overridden in accordance with the feature flag overrides.

One or more embodiments also include a feature flag database 1211 associated with the remote back-end server. The remote back-end server: retrieves the default feature flag values from the feature flag database, as 1t 1227, 1229; generates the updated feature flag profile based on the retrieved default feature flag values and the feature flag overrides, as at 1231; and uses business logic to generate the data in accordance with the updated feature flag profile, as at 1233.

Feature flag database 1211 includes, for example, a plurality of profiles for a plurality of versions of a plurality of clients including the at least one client.

The data sent at 1235 can include, for example, data specifying a user interface for the client; and/or search results setting forth results of a search conducted by the back-end server using a non-default search routine specified by the feature flag overrides.

In one or more embodiments, the remote targeted feature flag configuration server 1203 obtains a request from the at least one client upon initialization (i.e., of the client) to cause the remote targeted feature flag configuration server to provide the feature flag overrides. The request includes, for example, account information for an account holder associated with the client, and a device identifier for the client. The request is implemented, for example, via an application program interface (API) call.

In some cases, the remote targeted feature flag configuration server 1203 uses logic to determine the feature flag overrides associated with the client based on the account information and the device identifier. See, e.g., FIGS. 13A and 13B and accompanying text.

The default feature flag values can, for example, be OFF and the feature flag overrides can, for example, turn corresponding features ON.

The video content network system can be connected to a plurality of clients including the at least one client; the remote targeted feature flag configuration server can provides the feature flag overrides to additional ones of the plurality of clients; and the remote back-end server can obtain, from the additional ones of the plurality of clients, the feature flag overrides, and can provide, to the additional ones of the plurality of clients, the data to be rendered in accordance with the updated feature flag profile including both default feature flag values and feature flag values overridden in accordance with the feature flag overrides, so as to allow for a gradual rollout or the like.

In a further aspect, an exemplary method includes the functionality just described with respect to the video content network system; i.e., providing, from a remote targeted feature flag configuration server 1203 of a video content network system, to a client 1201, feature flag overrides associated with said client; obtaining, at a remote back-end server 1207, from said client, said feature flag overrides; and providing, from said remote back-end server, to said client, data to be rendered in accordance with an updated feature flag profile comprising both default feature flag values and feature flag values overridden in accordance with said feature flag overrides (optionally including any of the additional functionality discussed above).

The functionality at the client can be implemented, for example, by rendering code in a browser and/or via an "app" executing on the client. The browser executable code and/or the "app" can be provided, for example, from an MSO.

It should also be noted that, in general, methods can include steps performed by the remote targeted feature flag configuration server 1203, the client 1201, the remote back-end server 1207, or any combination of two or more thereof.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
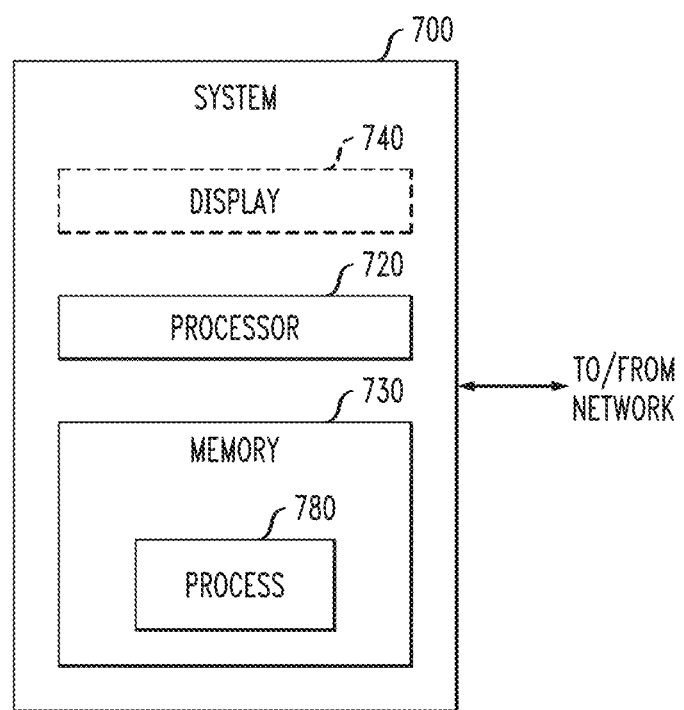
FIG. 7 is a block diagram of a computer system useful in connection with one or more aspects of the invention.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server implementing one or more of the servers shown in the figures (servers 1203 and 1207 are non-limiting examples) or on a client such as client 1201, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement the elements in FIGS. 10 and 11. The method steps can then be carried out using the distinct software modules of the system, as described above, executing on one or more hardware processors (e.g., a hardware processor or server located in the premises, head end, regional data center 1048, national data center 1098, in the cloud, or on a remote/roaming client). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
at a video content network client for rendering information from a remote back-end server, obtaining, from a remote targeted feature flag configuration server of said video content network, feature flag overrides associated with said client;
sending said feature flag overrides from said video content network client to the remote back-end server of said video content network;
at said video content network client, obtaining, from said remote back-end server, data to be rendered in accordance with an updated feature flag profile comprising both default feature flag values and feature flag values overridden in accordance with said feature flag overrides, wherein each default feature flag value defines a parameter of a corresponding feature and each overridden feature flag value defines a parameter of a corresponding overridden feature; and
rendering said data on said video content network client in accordance with the updated feature flag profile;
further comprising said remote back-end server;
retrieving said default feature flag values from a feature flag database;
generating said updated feature flag profile based on said retrieved default feature flag values and said feature flag overrides; and
using business logic to generate said data in accordance with said updated feature flag profile.

2. The method of claim 1, wherein said feature flag database includes a plurality of profiles for a plurality of versions of a plurality of clients including said video content network client.

3. The method of claim 2, wherein said data comprises data specifying a user interface for said client.

4. The method of claim 2, wherein said data comprises search results setting forth results of a search conducted by said back-end server using a non-default search routine specified by said feature flag overrides.

5. The method of claim 1, wherein said video content network client sends a request to said remote targeted feature flag configuration server upon initialization to obtain said feature flag overrides.

6. The method of claim 5, wherein said request includes account information for an account holder associated with said client, and a device identifier for said client.

7. The method of claim 6, wherein said request is implemented via an application program interface (API) call.

8. The method of claim 7, further comprising said remote targeted feature flag configuration server using logic to determine said feature flag overrides associated with said client based on said account information and said device identifier.

9. The method of claim 1, wherein said default feature flag values comprise OFF and said feature flag overrides turn corresponding features ON.

10. The method of claim 1, wherein said default feature flag values comprise ON and said feature flag overrides turn corresponding features OFF.

11. The method of claim 1, further comprising repeating said steps of obtaining said feature flag overrides, sending said feature flag overrides, obtaining said data to be rendered, and rendering said data for a plurality of additional clients to implement a gradual feature rollout.

12. The method of claim 1, wherein said video content network client sends a request to said remote targeted feature flag configuration server upon initialization to obtain said feature flag overrides and wherein said request includes account information for an account holder associated with said client, and a device identifier for said client for determining said feature flag overrides.

13. A video content network client comprising:
a memory; and
at least one processor, coupled to said memory, and operative to:
obtain, from a remote targeted feature flag configuration server of said video content network, feature flag overrides associated with said client;
send, from said video content network client, to a remote back-end server of said video content network, said feature flag overrides;
obtain, from said remote back-end server, data to be rendered in accordance with an updated feature flag profile comprising both default feature flag values and feature flag values overridden in accordance with said feature flag overrides, wherein each default feature flag value defines a parameter of a corresponding feature and each overridden feature flag value defines a parameter of a corresponding overridden feature, the data to be rendered in accordance with the updated feature flag profile having been generated by said remote back-end server using business logic; and
render said data on said video content network client in accordance with the updated feature flag profile.

14. A video content network system connected to at least one client, said system comprising:
a remote targeted feature flag configuration server that provides, to the client, feature flag overrides associated with said client; and
a remote back-end server that obtains, from said client, said feature flag overrides, and provides, to the client, data to be rendered in accordance with an updated feature flag profile comprising both default feature flag values and feature flag values overridden in accordance with said feature flag overrides, wherein the client is configured to render said data from said remote back-end server, wherein each default feature flag value defines a parameter of a corresponding feature and each overridden feature flag value defines a parameter of a corresponding overridden feature;

further comprising a feature flag database associated with said remote back-end server, wherein said remote back-end server:
  retrieves said default feature flag values from said feature flag database; and
  generates said updated feature flag profile based on said retrieved default feature flag values and said feature flag overrides; and
uses business logic to generate said data in accordance with said updated feature flag profile.

15. The video content network system of claim 14, wherein said feature flag database includes a plurality of profiles for a plurality of versions of a plurality of clients including the at least one client.

16. The video content network system of claim 15, wherein said data comprises data specifying a user interface for said client.

17. The video content network system of claim 15, wherein said data comprises search results setting forth results of a search conducted by said back-end server using a non-default search routine specified by said feature flag overrides.

18. The video content network system of claim 14, wherein said remote targeted feature flag configuration server obtains a request from the at least one client upon initialization to cause said remote targeted feature flag configuration server to provide said feature flag overrides.

19. The video content network system of claim 18, wherein said request includes account information for an account holder associated with the client, and a device identifier for the client.

20. The video content network system of claim 19, wherein said request is implemented via an application program interface (API) call.

21. The video content network system of claim 20, wherein said remote targeted feature flag configuration server uses logic to determine said feature flag overrides associated with the client based on said account information and said device identifier.

22. The video content network system of claim 14, wherein said default feature flag values comprise OFF and said feature flag overrides turn corresponding features ON.

23. The video content network system of claim 14, wherein said default feature flag values comprise ON and said feature flag overrides turn corresponding features OFF.

24. The video content network system of claim 14, wherein:
  said system is connected to a plurality of clients including the at least one client;
  said remote targeted feature flag configuration server provides said feature flag overrides to additional ones of said plurality of clients; and
  said remote back-end server obtains, from said additional ones of said plurality of clients, said feature flag overrides, and provides, to said additional ones of said plurality of clients, said data to be rendered in accordance with said updated feature flag profile comprising both default feature flag values and feature flag values overridden in accordance with said feature flag overrides.

25. A method comprising:
providing, from a remote targeted feature flag configuration server of a video content network system, to a client configured to render information from a remote back-end server, feature flag overrides associated with said client;
obtaining, at said remote back-end server, from said client, said feature flag overrides; and
providing, from said remote back-end server, to said client, data to be rendered in accordance with an updated feature flag profile comprising both default feature flag values and feature flag values overridden in accordance with said feature flag overrides, wherein each default feature flag value defines a parameter of a corresponding feature and each overridden feature flag value defines a parameter of a corresponding overridden feature;
further comprising, at said remote back-end server, retrieving said default feature flag values from a feature flag database, generating said updated feature flag profile based on said retrieved default feature flag values and said feature flag overrides, and using business logic to generate said data in accordance with said updated feature flag profile, wherein said feature flag database includes a plurality of profiles for a plurality of versions of a plurality of clients including said video content network client and wherein said data comprises search results setting forth results of a search conducted by said remote back-end server using a non-default search routine specified by said feature flag overrides.

* * * * *